United States Patent [19]

Yamada et al.

[11] 4,128,618

[45] Dec. 5, 1978

[54] PROCESS FOR EXTRACTING ALUMINA FROM ALUMINA-CONTAINING ORES

[75] Inventors: Koichi Yamada; Takuo Harato; Takahiro Ishida, all of Niihama; Yasumi Shiozaki, Saijo, all of Japan

[73] Assignee: Sumitomo Aluminium Smelting Company, Ltd., Osaka, Japan

[21] Appl. No.: 820,897

[22] Filed: Aug. 1, 1977

[30] Foreign Application Priority Data

Aug. 6, 1976 [JP] Japan .................................. 51-94280

[51] Int. Cl.$^2$ .............................................. C01F 7/06
[52] U.S. Cl. .................................... 423/119; 423/121
[58] Field of Search ........................ 423/119, 121, 131

[56] References Cited

U.S. PATENT DOCUMENTS

| 3,357,792 | 12/1967 | Gebefugi | 423/121 |
| 3,413,087 | 11/1968 | Roberts | 423/118 |
| 3,579,295 | 5/1971 | Tamisi et al. | 423/121 |
| 3,997,650 | 12/1976 | Yamada et al. | 423/119 |

FOREIGN PATENT DOCUMENTS 1145105  3/1969  United Kingdom ..................... 423/121

*Primary Examiner*—Herbert T. Carter
*Attorney, Agent, or Firm*—Stevens, Davis, Miller & Mosher

[57] ABSTRACT

In a process for extracting alumina from alumina-containing ores on a two-stream system by individually preheating a slurry of alumina-containing ores and an aqueous alkali solution each in preheaters of indirectly heating, mixing the preheated slurry with the preheated aqueous alkali solution, and extracting alumina from the ores in a digester of either the heating type involving the direct injection of live steam or the heat-insulated type, the alumina is extracted from the ores by preparing the slurry of alumina-containing ores with water or a diluted aqueous alkali solution, such as from the drain obtained by recovering steam from an evaporator for cooling the slurry resulting from extraction, and utilizing the recovered steam in preheating the slurry of the alumina-containing ores or decomposition solution or both, preheating the slurry of alumina-containing ores, and mixing the preheated slurry with an aqueous alkali solution preheated as another stream as the decomposition solution. Scale formation can be prevented completely or substantially on an inside surface of the preheater for the slurry of alumina-containing ores.

8 Claims, 1 Drawing Figure

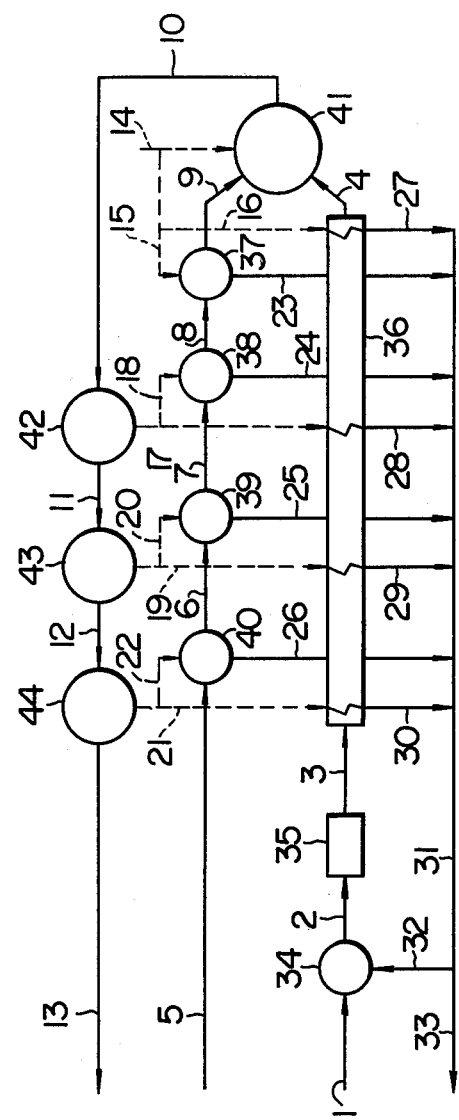
FIG.

PROCESS FOR EXTRACTING ALUMINA FROM ALUMINA-CONTAINING ORES

This invention relates to a process for extracting alumina from alumina-containing ores, and more particularly to a process for extracting alumina from alumina-containing ores (which will be hereinafter referred to as bauxite) by individually preheating a slurry of bauxite, and an alkali solution, mixing the preheated slurry with the preheated alkali solution, thereby effecting extraction of alumina from the bauxite, that is, the so-called two-stream system for extracting alumina from bauxite wherein formation of scales on inside walls of slurry preheater is completely or substantially prevented.

The Bayer process is most usually used for extraction of alumina from bauxite, and comprises an extraction step of subjecting pulverized bauxite to extraction with an alkali solution such as a caustic soda solution or a mixed solution of caustic soda and sodium carbonate, thereby obtained a slurry of sodium aluminate solution, in which alkali-insoluble residues other than alumina, for example, iron oxide, silicates, titanium oxide, etc. are suspended; a red mud separation step of separating said insoluble residues from the resulting slurry, thereby obtaining a clear solution of sodium aluminate; a precipitation step of adding seed aluminum hydroxide to the clear solution of sodium aluminate, thereby precipitating aluminum hydroxide; and a recycle step of separating the precipitated aluminum hydroxide from the solution of sodium aluminate, withdrawing a portion of separated aluminum hydroxide precipitate as a product, and recycling the remaining portion of aluminum hydroxide precipitate as seed, while recycling the separated solution of sodium aluminate (which will be hereinafter referred to as a decomposition solution) to the extraction step for bauxite directly or after concentration.

The Bayer process can be further classified, on the basis of extraction procedure, into a one-stream system, in which the bauxite and the alkali solution necessary for the extraction are mixed together, and subjected to extraction after preheating, and a two-stream system, in which a slurry of alumina-containing ores in an aqueous alkali solution and an aqueous alkali solution are mixed together after the slurry and the aqueous alkali solution have been preheated individually with recovered steam, and then the mixture is subjected to extraction.

According to the two-stream process, a recycled decomposition solution is usually divided into a main stream taking 80–90% by volume of total decomposition solution and a side stream taking 20–10% by volume of the total decomposition solution. The main stream of the decomposition solution is preheated to a temperature near the extraction temperature (usually about 100° C. or higher in the case of alumina trihydrate-containing ores, and about 170° C. or higher in the case of alumina monohydrate-containing ores) in a preheater of the indirect heating type with steam recovered from an evaporator for cooling the slurry resulting from the extraction, whereas the side stream is mixed with bauxite to obtain a slurry whose solid concentration may be about 20 to about 50% by weight, and the resulting slurry is preheated to a temperature near the extraction temperature (usually about 100° C. or higher in the case of alumina trihydrate-containing ores and about 170° C. or higher in the case of alumina monohydrate-containing ores) in a preheater of the indirect heating type with steam recovered from an evaporator for cooling the slurry resulting from the extraction in the same manner as for the main stream, then mixed with said preheated main stream of decomposition solution and the resulting mixture is charged into a digester of the direct heating type involving live steam injection and then subjected to extraction.

However, since the medium for the side stream is the decomposition solution (highly concentrated aqueous alkali solution; usually $Na_2O$:100–170 g/l) in the said Bayer process, a desilication reaction, and sometimes boehmite formation reaction, depending upon conditions, takes place when heated, and consequently scales are deposited on an inside surface of the preheater, resulting in considerable reduction of heat transfer coefficient and consequent increase of steam consumption or reduction of heat recovery efficiency.

Furthermore, an operating duration is shortened for scale removal, or much labor and expenses are required for scale removal, bringing about serious disadvantages.

To improve these disadvantages, a process has been proposed, which comprises heating the slurry to a temperature of about 70° to about 250° C. in advance, thereby effecting the so-called preliminary desilication treatment, thereby depositing silica components of the slurry as desilication products before preheating and preheating the slurry to a temperature near the extraction temperature, thereby preventing occurrence of the desilication reaction in the preheater and reducing the amount of scales to be deposited onto the inside surface of the preheater (U.S. Pat. No. 3,413,087).

Said prior process is excellent in the sense of preventing formation of scales originating from the desilication products. To utilize the feature of the two-stream system to a maximum, it is however desirable to preheat the slurry to a temperature as high as possible, for example, a temperature near the extraction temperature, and thus the slurry resulting from the preliminary desilication treatment is preheated to a temperature near the extraction temperature, but in that case it is impossible to prevent formation of scales onto the inside surface of the preheater in spite of the preliminary desilication treatment conducted in advance.

Some of the present inventors previously found that boehmite-type alumina was deposited to form scales at a molar ratio of $Na_2O/Al_2O_3$ of not more than 1 in the side stream slurry (U.S. Pat. No. 3,997,650).

That is, formation of scales on the inside surface of the preheater for slurry cannot be completely or substantially prevented according to the two-stream processes so far proposed.

An object of the present invention is to prevent the deposition of scales onto the inside surface of a slurry preheater and make effective utilization of the heat recovered from the extraction step in a process for extracting alumina from bauxite, based on a two-stream system.

That is, the present invention provides a process for extracting alumina from bauxite which comprises individually preheating a bauxite slurry and an aqueous alkali solution in the respective preheaters of indirect heating, mixing the preheated slurry with the preheated aqueous alkali solution, and extracting alumina from the bauxite in a digester which is heated by either direct injection of live steam or by use of a digester of the heat-insulated type, based on the so-called two-stream system, wherein an improvement comprises mixing raw material bauxite with water or a diluted aqueous alkali solution to make the bauxite slurry, preheating the bauxite slurry, then mixing the preheated slurry with an aqueous alkali solution preheated as another stream, and extracting alumina from the bauxite, thereby effecting an economical extraction of alumina while completely or substantially preventing deposition of scales on an inside surface of the preheater for the bauxite slurry.

Now, the present invention will be described in detail below:

The present invention is applied to a process for extracting alumina from bauxite, based on the so-called two-stream system, which comprises individually preheating a bauxite slurry and an aqueous alkali solution each by indirect heating, and feeding the preheated bauxite slurry and the preheated aqueous alkali solution to a digester maintained at about 140° C. or higher in the case the bauxite contains alumina trihydrate, or at about 200° C. or higher in the case the bauxite contains alumina monohydrate, thereby extracting alumina from the bauxite.

According to the present invention, the raw material bauxite is, directly, or after crushing, mixed with water or a diluted aqueous alkali solution to make a bauxite slurry, and then the resulting slurry is, directly, or after wet milling, fed to a preheating step, or the raw material bauxite is admixed with a portion of water or the diluted aqueous alkali solution for making the bauxite slurry, then wet milled, further admixed with the remaining portion of water or the diluted aqueous alkali solution, and then fed to the preheating step.

Water is preferable as the medium for making the bauxite slurry from the viewpoint of complete prevention of scales from the deposition on the inside surface of the preheater, but an aqueous alkali solution of low concentration, for example, not more than about 10 g/l, preferably not more than 1 g/l of the alkali in terms of $M_2O$, where M represents Na or K, can be also preferably used.

A drain obtained by recovering steam from an evaporator for cooling the slurry resulting from the extraction, and utilizing the recovered steam in preheating the bauxite slurry and/or decomposition solution is particularly preferably used from the viewpoint of attaining an effective utilization of heat.

The drain resulting from the steam recovered from the evaporator for cooling the slurry usually is contaminated with mists at flashing, and thus contains alkaline matters, but can be quite satisfactorily used as the medium without any trouble.

The slurry to be fed to the preheating step must have a transferable concentration, and the concentration of solid matters of the slurry is adjusted usually to about 20% by weight or higher, preferably 40 to 70% by weight.

The present invention is based on preparation and preheating of a bauxite slurry by use of water having no reactivity with components of the bauxite or a diluted aqueous alkali solution having a relatively low reactivity with the components of the bauxite, and the desired aim of the present invention is to completely or substantially prevent formation of scales at indirectly heating part of the preheater for the bauxite slurry.

Thus, a desilication reaction inevitably taking place in the preheating step in the conventional processes is prevented from its occurrence in the preheating step in the present invention, and consequently the desilication reaction takes place in the extraction step where the slurry and the aqueous alkali solution are mixed with each other. However, the digestor employed in the present invention has no heating means of the indirect heating type and thus even if scales are deposited on the inside surface of the digester, any inconvenience as encountered in the preheating step of indirect heating never appears.

As a preheater for the slurry, a double tube-type heat exchanger, autoclave-type heat exchanger, shell-and-tube-type heat exchanger, etc. of indirect heating can be used in the present invention.

In the present invention, the decomposition solution is heated to a temperature near the extraction temperature according to the well known procedure, that is, by steam recovered from the evaporator for cooling the slurry resulting from the extraction, by means of, for example, a double tube-type heat exchanger, shell-and-tube-type heat exchanger, etc. Particularly, the shell-and-tube-type heat exchanger is employed for this purpose.

It is desirable to preheat the bauxite slurry and the decomposition solution to a temperature as near the extraction temperature as possible or higher. Usually, they are preheated to about 100° C. or higher, preferably about 120° C. or higher in the case of the bauxite being alumina trihydrate-containing ores, and about 170° C. or higher, preferably 185° C. or higher in the case of the bauxite being alumina monohydrate ores.

However, when a digester of heat-insulated type, that is, a digester having no heating means is employed, the bauxite slurry and the decomposition solution are preheated to the extraction temperature or higher in the preheating step, that is, about 140° C. or higher in the case of the bauxite being alumina trihydrate-containing ores, and about 200° C. or higher in the case of the bauxite being alumina monohydrate-containing ores. That is, the preheating referred to in the present invention includes heating over the extraction temperature.

The stream recovered from the slurry resulting from the digester is usually used for the preheating of the bauxite slurry and the decomposition solution. However, it is desirable to carry out indirect heating in the preheating step by utilizing live steam besides the utilization of the recovered steam, because heating to higher temperature can be realized and decrease in the load of the evaporation step can be made thereby.

The drain is usually utilized in washing of red mud, etc. and water is balanced in the Bayer process. Thus, when the drain is used in the preparation of bauxite slurry and live steam is injected to the extraction step, as usually used, in the present invention, the amount of the drain used in the washing of red mud, etc. is changed, and consequently such adjustments as to, for example, increase a capacity of the concentrating step, etc. must be made to the process. When the indirect heating by live steam is applied to the preheating step as described above, the amount of live steam to be fed to the extraction step can be reduced, and thus the drain can be utilized without change in its amount and any increase in the faculty of the concentrating step.

According to the present invention, the preheated bauxite slurry and the preheated decomposition solution are fed, individually, or after joined together, to the extraction step of a heating type of direct injection of live steam or a heat-insulated type, where the extraction is completed. It is essential that the digester be of a heating type of either the direct injection of live steam or of a heat-insulated type, because no preliminary desilication treatment is carried out or no desilication reaction is carried out completely or substantially in the preheating step for the bauxite slurry in the present invention, and thus the desilication reaction takes place in the digester where the bauxite slurry and the decomposition solution are mixed with each other. That is, use of a digester of indirect heating makes scales deposit at the heat transfer part of the heater, resulting in considerable decrease in the heat transfer coefficient.

Structure of the digester is not particularly limited, but usually a vessel provided with a stirrer is preperably used as the digester.

Extracting conditions are not particularly limited, and the conventionally used conditions are applicable to the present invention. Extracting temperature is usually about 140° C. or higher in the case of alumina trihydrate-containing ores, and about 200° C. or higher in the case of alumina monohydrate-containing ores.

Now, the present invention will be described in detail, referring to the accompanying drawing, but will not be limited to the drawing.

Single FIGURE is a flow diagram showing one embodiment of the present invention.

In FIGURE, uncrushed or crushed raw material bauxite is fed to slurry tank 34 through line 1 and prepared into a slurry there with a portion of drain fed from preheater 36 through lines 31 and 32.

Remaining portion of the drain is discharged from line 33 and utilized, for example, as a washing liquor for red mud.

The bauxite prepared into the slurry by the drain is then led to wet milling step 35 through line 2, and milled there to desired particle sizes. The resulting milled bauxite slurry is led to preheater 36 through line 3.

FIGURE shows the case of feeding all the amount of drain to be used for the preparation of the slurry to slurry preparation tank 34, but, for example, a suitable portion of the drain for the wet milling can be added to slurry preparation tank 34, and after the milling, the milled slurry is transferred and again admixed with such an amount of the drain as to give a suitable concentration of solid matters for preheating conditions. The wet milled slurry is led to heat exchanger 36 of double tube-type, to which heat is supplied from evaporators 42, 43 and 44 through lines 17, 19 and 21, correspondingly, and preheated there usually to 100° C. or higher in the case of alumina trihydrate-containing ores, or 170° C. or higher in the case of alumina monohydrate-containing ores.

On the other hand, decomposition solution from line 5 is preheated to a temperature near the extraction temperature or higher in heat exchangers 40, 39 and 38 usually of shell-and-tube type, to which heat is supplied from evaporators 44, 43 and 42 through lines 21-22, 19-20, and 17-18, and heat exchanger 37 by live steam supplied through lines 14 and 15. In FIGURE, the indirect heating by supplying live steam to the slurry preheater through lines 14, 15 and 16, and to the decomposition solution preheater through lines 14 and 15 is shown, because this is the preferable mode of practice. Sometimes, the indirect heating by live steam can be omitted.

The decomposition solution and the aqueous bauxite slurry, each, preheated to a temperature near the extraction temperature are withdrawn through lines 9 and 4, respectively, and fed to digester 41. The digester is a high pressure reaction vessel, such as an autoclave provided with a stirrer, and is usually heated to about 140° C. to about 300° C., depending upon the kind of the raw material bauxite. The slurry is retained in the digester for a time required for substantial extraction of alumina from the bauxite. Digester 41 is heated by direct injection of live steam into it through line 14.

The slurry resulting from extraction of the alumina as sodium aluminate from the ores in digester 41 is withdrawn from the digester through line 10, passed through lines 11 and 12, cooled in evaporators 42, 43 and 44 for cooling, and sent to successive step through line 13.

Steam recovered in evaporators 42, 43 and 44 is usually utilized as a heat source for preheating the decomposition solution and the bauxite slurry.

The slurry leaving last evaporator 44 for cooling is sent to a blow-off tank through line 13, returned to the atmospheric pressure there, and subjected to red mud separation. The resulting clear solution of sodium aluminate is admixed with seed aluminum hydroxide, and subjected to decomposition, and separation of deposited aluminum hydroxide. The resulting aluminum hydroxide is a product, whereas the decomposition solution resulting from the separation of aluminum hydroxide is recycled to line 5 and reused.

Drains from the preheating steps for the bauxite slurry and the decomposition solution are withdrawn from individual lines 30, 29, 28, 27, 26, 25, 24 and 23, and collected into line 31, a portion of which is withdrawn through line 32 for the preparation of the bauxite slurry, and the remaining portion of which is withdrawn through line 33 and used, for example, in washing of red mud, etc.

Specific numbers of evaporators for cooling and specific numbers of preheaters for the decomposition solution and the bauxite slurry are shown in FIGURE, but any desired number of the evaporators and the preheaters can be, of course, employed.

According to the present invention described in detail as above, formation of scales on the inside surface of the slurry preheater can be completely or substantially prevented in the process for extracting alumina from bauxite, based on the two-stream system, and thus steam comsumption can be considerably reduced.

Since the formation of scales in the preheating step can be completely or substantially prevented, the preheating temperature can be made considerably higher than in the conventional processes where the scales are formed. That is, the feature of the two-stream system can be obtained advantageously to the maximum.

Furthermore, since the formation of scales on the inside surface of the slurry preheater can be completely or substantially prevented, an operating duration of the apparatus can be considerably prolonged. This brings about a remarkable commercial advantages.

Now, the present invention will be described in further detail by way of Examples, but will not be restricted to these Examples.

EXAMPLE 1

Extraction of alumina from bauxite was carried out in an apparatus as shown in FIGURE.

Crushed bauxite was fed to slurry preparation tank 34 through line 1, whereas a drain having an alkali concentration of 100 mg/l in terms of $Na_2O$ was supplied to the slurry preparation tank through line 32 to prepare a bauxite slurry having a solid matter concentration of 60% by weight. The resulting bauxite slurry was led to wet mill 35 through line 2, milled there, then led to slurry preheater 36 of double tube type through line 3, and preheated to 220° C. by the steam recovered from the slurry resulting from the extraction and live steam.

On the other hand, decomposition solution was passed through line 5, and preheaters 40, 39, 38 and 37 of shell-and-tube type, and preheated to 220° C. by the steam recovered from the slurry resulting from the extraction, and live steam.

The preheated decomposition solution and the preheated slurry were withdrawn through lines 9 and 4, respectively, led to digester 41 and subjected to extraction of alumina there. The digester was heated to about 230° C. by directly injecting live steam there through line 14. Continuous operation was carried out in said manner for a duration of 6 months to investigate steam consumption and scale formation on the inside surface of the slurry preheater. The results are given in Table 1.

Table 1

| Steam consumption | 1550 kg/ton of $Al_2O_3$ |
|---|---|
| Scale formation | Not detected |

EXAMPLE 2

Extraction of alumina from bauxite was carried out in an apparatus as shown in FIGURE.

Crushed bauxite was fed to slurry preparation tank 34 through line 1, whereas water was supplied to the slurry preparation tank through line 32 in place of drain to prepare a bauxite slurry having a solid matter concentration of 60% by weight.

The resulting bauxite slurry was led to wet mill 35 through line 2, milled there, then led to slurry preheater 36 of double tube type through line 3, and preheated to 220° C. by the steam recovered from the slurry resulting from extraction and live steam.

On the other hand, decomposition solution was passed through line 5, preheaters 40, 39, 38 and 37 of shell-and-tube type, and preheated to 220° C. by the steam recovered from the slurry from the extraction, and live steam.

The preheated decomposition solution and the preheated slurry were withdrawn through lines 9 and 4, respectively, led to digester 41 and subjected to alumina extraction there. The digester was heated to about 230° C. by directly injecting live steam there through line 14.

The operation was continuously carried out in said manner for a duration of 6 months to investigate steam consumption and scale formation on the inside surface of the slurry preheater. The results are shown in Table 2.

Table 2

| Steam consumption | 1550 kg/ton of $Al_2O_3$ |
|---|---|
| Scale formation | Not detected |

COMPARATIVE EXAMPLE

Extraction of alumina from bauxite was carried out in the same manner and under the same conditions as in Example 1, except that the supply of drain through line 32 was stopped, and instead the bauxite slurry was prepared with a portion of the decomposition solution, a preliminary desilication treatment of the bauxite slurry was carried out at a temperature of 90° C. for 4 hours, and the preheating by live steam was eliminated, while the live steam for heating was directly injected to the extraction step. The results are shown in Table 3.

Table 3

| Steam consumption | 1550 kg/ton of $Al_2O_3$ |
|---|---|
| Maximum operating duration | About 3 weeks |

As shown above, it is evident that the present invention is considerably distinguished over the conventional process.

What is claimed is:

1. In a process for extracting alumina from alumina-containing ores on a two-stream system by individually preheating a slurry of alumina-containing ores and an aqueous alkali solution each in preheaters of indirect heating, mixing the preheated slurry with the preheated aqueous alkali solution, and extracting alumina from the alumina-containing ores in a digester which is either heated by direct injection of live steam or is a digester of the heat-insulated type, the improvement which comprises preparing the slurry of alumina-containing ores having a solid matter concentration of about 20% by weight or higher with water or a diluted aqueous alkali solution having an alkali concentration of not more than about 10 g/l in terms of $M_2O$, where M represents Na or K, preheating the slurry, mixing the preheated slurry with an aqueous alkali solution preheated as another stream as a decomposition solution, and extracting alumina from the ores, thereby completely or substantially preventing scale formation on an inside surface of the preheater for the slurry.

2. A process according to claim 1, wherein the slurry of alumina-containing ores is prepared with the drain obtained by recovering steam from an evaporator for cooling slurry resulting from extraction, and utilizing the recovered steam in preheating the slurry of alumina-containing ores or the decomposition solution or both.

3. A process according to claim 1, wherein the slurry of alumina-containing ores has a solid matter concentration of 40 to 70% by weight.

4. A process according to claim 1, wherein the preheater for the slurry is of a double tube type heat exchanger.

5. A process according to claim 1, wherein the preheater for the decomposition solution is of shell-and-tube type heat exchanger.

6. A process according to claim 1, wherein the slurry of alumina-containing ores and the decomposition solution are preheated by steam recovered from evaporator for cooling slurry resulting from extraction.

7. A process according to claim 1, wherein the slurry of alumina-containing ores and the decomposition solution are preheated by the steam recovered from an evaporator for cooling slurry resulting from extraction, and live steam.

8. A process according to claim 1, wherein the alumina-containing ores are alumina monohydrate-containing ores, and the slurry is preheated to about 170° C. or higher.

* * * * *